US 6,698,967 B2

(12) United States Patent
Henrich et al.

(10) Patent No.: US 6,698,967 B2
(45) Date of Patent: Mar. 2, 2004

(54) DEVICE FOR LONGITUDINAL ADJUSTMENT, IN PARTICULAR OF A REMOTE CONTROL IN MOTOR VEHICLES

(75) Inventors: Willi Henrich, Ehringshausen-Katzenfurt (DE); Bernd Bock, Löhnberg (DE)

(73) Assignee: Küster Automotive Control Systems GmbH, Ehringhausen (DE)

( * ) Notice: Subject to any disclaimer, the term of this patent is extended or adjusted under 35 U.S.C. 154(b) by 76 days.

(21) Appl. No.: 09/878,929

(22) Filed: Jun. 13, 2001

(65) Prior Publication Data
US 2003/0205439 A1 Nov. 6, 2003

(30) Foreign Application Priority Data
Jun. 13, 2000 (DE) .......................................... 100 28 429

(51) Int. Cl.[7] ................................................. F16C 1/22
(52) U.S. Cl. ..................... 403/325; 74/502.4; 74/502.6; 74/501.5 R; 188/67
(58) Field of Search ................. 180/170, 178; 123/361, 342, 339.27; 74/501.5, 501.5 R, 502.4, 502.6; 403/409.1, 373, 374.1, 374.2, 325; 192/111 A; 188/67, 265, 300

(56) References Cited
U.S. PATENT DOCUMENTS
5,544,543 A * 8/1996 Hilgert et al. ............. 74/502.4
6,193,433 B1 * 2/2001 Gutierrez et al. ........... 403/325

FOREIGN PATENT DOCUMENTS
| DE | 3876208 T2 | 4/1993 |
| DE | 69117882 T2 | 7/1996 |
| DE | 19620496 A1 | 11/1997 |
| DE | 19704053 A1 | 2/1998 |
| DE | 19825360 A1 | 12/1999 |
| EP | 224399 A1 | 6/1987 |
| EP | 638733 A1 | 2/1995 |
| EP | 967403 A1 | 12/1999 |

* cited by examiner

Primary Examiner—Lynne H. Browne
Assistant Examiner—Ryan M. Flandro
(74) Attorney, Agent, or Firm—Charles P. Boukus, Jr.

(57) ABSTRACT

A device (10) for length adjustment has a bar-shaped component (12) with an external profiling (14) which is received in a receptacle (16) of a base body (18). The base body (18) has at least one profiled segment (22, 24) which, under the influence of an axially slidable hollow element (28), is shifted into a locking position at a first axial position of the hollow element (28), in which the base body (18) and component (12) are axially rigidly coupled, and is shifted into an unlocking position at a second axial position of the hollow element (28), in which the base body (18) and component (12) are axially displaceable relative to one another. The device (10) is distinguished in that a locking member (34) with two locking member positions (36, 38) is provided, in which in the first locking member position (36), the hollow element (28) is retained under the influence of spring bias in the first axial position (30), and in the second locking member position (38), the hollow element (28) is retained by the locking member (34) in the second axial position (32), counter to the influence of the spring bias (FIG. 2).

10 Claims, 2 Drawing Sheets

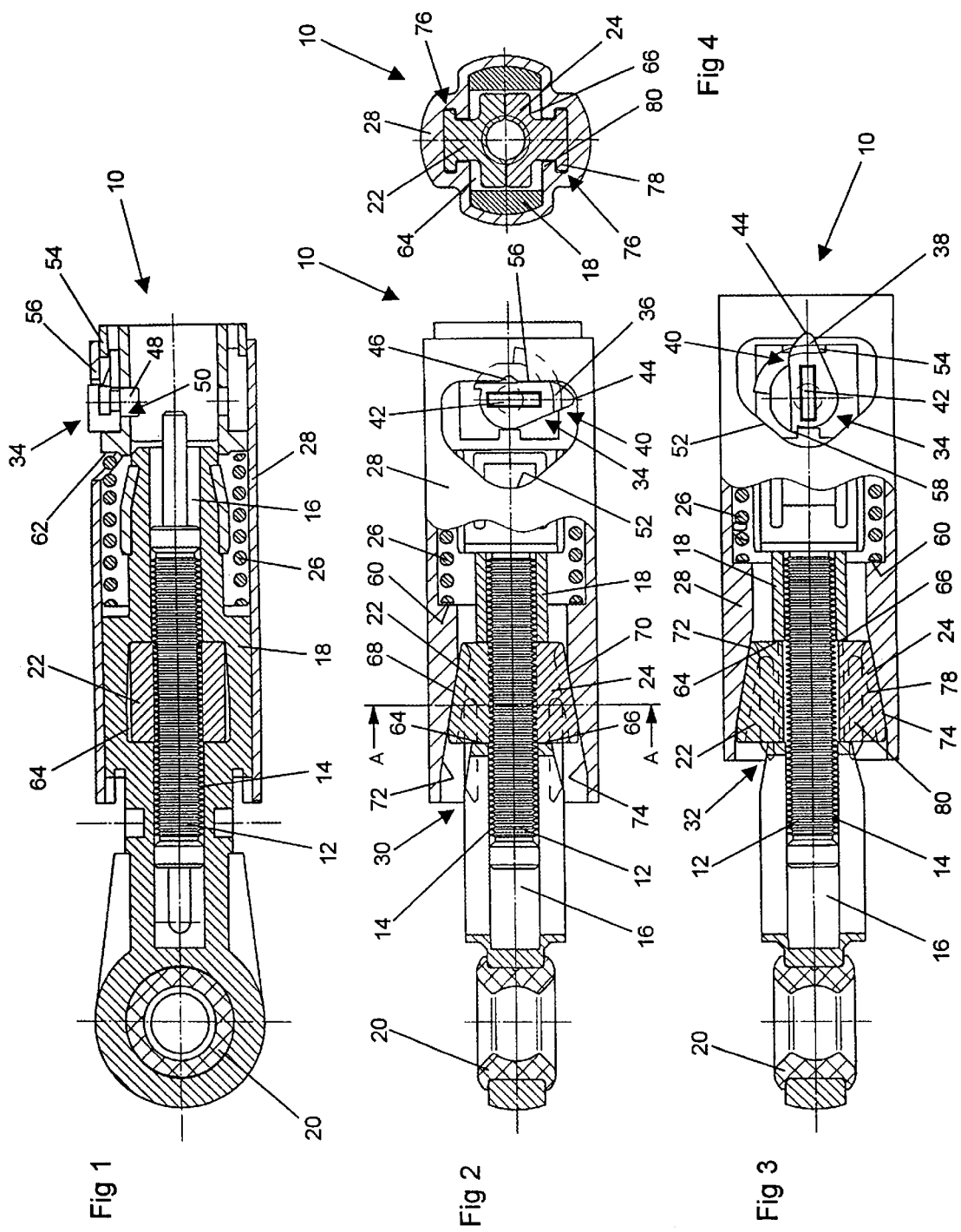

DEVICE FOR LONGITUDINAL ADJUSTMENT, IN PARTICULAR OF A REMOTE CONTROL IN MOTOR VEHICLES

BACKGROUND OF THE INVENTION

The invention relates to a device for longitudinal adjustment, in particular of a remote control in motor vehicles, having a substantially bar-shaped component that has an external profiling, for example a set of teeth. The component for example is a tension or pressure rod, sleeve or bar. The component is at least partly received in a receptacle of a base body which optionally has a pivotal connecting piece or similar binding. At least one profiled segment is guided radially displaceably on the base body by axial movement of a hollow element such as a sleeve or locking sleeve on the base body. The hollow element is spring biased in a first axial position to hold the profiled segment in a locking position in which the base body and component are rigidly coupled in the axial direction. Movement of the hollow element to a second axial position against the spring bias transfers the profiled segment to an unlocking position in which the base body and component are displaceable relative to one another in the axial direction.

Such a device is known for instance from European Patent Disclosure EP 0 638 733 A1. This involves a device with parts in the form of hollow bars and tubes that can be slipped inside one another and locked to one another at various insertion depths by means of a detent element retained in the detent position by the force of a spring, and on their free ends they each have a receptacle for the outer sleeve of an actuating cable, for instance, whose inner cable extends through the part in the form of the hollow bar and the tube. To make a fast adjustment possible, a sleeve-like part can be slipped over the hollow-bar and the tubular part and joined to the tubular part, and the sleeve-like part in the region of the hollow-bar part has a conical contact face, on which the annularly embodied detent element, slipped over the hollow-bar part, slides with a radially outer stop face and is retained in the detent position on the hollow-bar part by means of the compression spring.

From German Patent Disclosure DE 197 04 053 A1, a compensation element for a tension and pressure rod is known, which element is used for instance in motor vehicle transmissions between the shift lever and the transmission. To achieve a continuously variable length compensation, a spring is provided which directly or indirectly brings about clamping between the tension and pressure rod in the housing of the compensation element or a binding.

German Patent Disclosure DE 196 20 496 A1 also discloses a device for correcting or adjusting the length of Bowden cables, actuating cables or the like with a detent segment sleeve, whose detent segments, which have toothing, are disposed on flexible arms. By means of the detent segments, a detent sleeve that has a counterpart toothing can be locked in detent fashion in different axial positions relative to a longitudinal axis of the device. The detent sleeve and the detent segment sleeve are under the influence of a first compression spring that forces the two sleeves apart. Under the influence of a second compression spring, a securing sleeve can be positioned in a detent-locking position in which the detent segments are in engagement with the detent sleeve. Guide means for the arms are disposed on the securing sleeve, and a shift of the securing sleeve out of the locking position into an unlocking position is converted into a guided motion of the arms, so that the toothing comes out of engagement with the counterpart toothing.

From German Patent Disclosure DE 38 76 208 T2, an automatic adjusting device for Bowden cables is also known in which a rod is separably joined to a tubular housing by means of a coupling device. To that end, clamping jaw parts are provided that are disposed inside an end portion of the tubular housing, around the rod. Each clamping jaw part has an outer, partially conical surface that cooperates with a complementary conical surface of the end part. An embracing restraining spring extends circumferentially in grooves in each clamping jaw part and in a resiliently yielding way forces the clamping jaw parts radially inward. A helical spring is also provided, which subjects the rod to bias such that this rod is urged axially inward into the housing by means of the bias. Finally, a device with a locking part and an unlocking part is provided that has the following function. To fit the adjusting device into a Bowden cable, the locking part is rotated into a position in which the rod extends freely through a bore in the locking part. The locking part and the tubular unlocking part are then axially forced toward the tubular housing, so as to displace the tubular unlocking part axially into the tubular housing; the inner end comes into contact with clamping jaws, and as a result the clamping jaw parts are brought axially and radially out of engagement with the undulations of the rod. Then, tension is exerted on the rod in tubular housing, in order to pull the rod axially out of the housing into an extended position in which the helical spring is compressed. Once the rod is in the extended position, the locking part is rotated in order to bring the undulations of the locking part into engagement with the undulations on the rod, thus preventing the rod from being retracted into the tubular housing by the action of the helical spring. The adjusting device is then secured to the Bowden cable, whereupon the locking part is rotated back into the original place in which the rod, as a consequence of the spring force, is retracted axially into the housing, and tension is applied to the Bowden cable.

Although these known devices have proven themselves quite well in practice, the problem exists in the industry for assembly workers, for instance on the assembly line of an automobile manufacturer, of performing a simple initial length adjustment once the device for length adjustment has been installed. In the known devices, major force must sometimes be expended to shift the hollow element from the first axial position into the second axial position, and the hollow element must be held in this position by the assembly worker so that he can then with his other hand perform a length adjustment, for instance of the bar-shaped component. Next, the hollow element, by being let go, is shifted automatically back into the first axial position under the influence of the spring force.

BRIEF SUMMARY OF THE INVENTION

By comparison, the object of the present invention is to perform a simplified, smooth length adjustment by means of the device, and in a secondary aspect, the length adjustment can be performed with one hand by the assembly worker.

According to the invention, in the device having the characteristics recited at the outset, this object is essentially attained in that the device has an actuator or locking member with two actuating positions or locking member positions; in the first actuating or locking position the hollow element is held in the first axial position by the action of the spring bias, and in the second actuating or locking position the hollow element is held in the second axial position by means of the actuator counter to the action of the spring bias.

This provision makes it possible to shift the device into a stable unlocking state or into a stable locking state, depending on the actuation position of the actuating means. For length adjustment, first the actuating means is shifted from the first actuating position into the second actuating position, so that the hollow element is in the second axial position, in which the profiled segment is shifted into the unlocking position. The device is designed such that the hollow element, when the actuating means is in the second actuating position, is retained stably in the second axial position. After that, the bar-shaped component, for length adjustment, can then be axially displaced relative to the base body. Once the displacement process of the bar-shaped component has been completed, the actuating means is shifted from the second actuating position into the first actuating position, so that the hollow element, under the influence of the bias of the spring, reaches the first axial position, in which the profiled segment is shifted into a locking position, so that the bar-shaped component and base body are rigidly coupled together with respect to any axial displacement. The device is easy and simple to manipulate, and for the entire process of length adjustment, the assembly worker needs to use only one hand.

In a first advantageous feature of the invention the actuator is embodied as an eccentric and optionally has a receptacle, a polygonal peg, or a similar handle. The embodiment as an eccentric makes simple, smooth displacement of the actuating means from the first actuating position into the second actuating position and vice versa possible. Because a handle, receptacle or polygonal peg is advantageously provided on the actuating means, the actuating means can for instance be actuated easily by hand or by using a screwdriver, socket wrench or other tool for setting the applicable actuating position.

Especially advantageously, the actuator is supported pivotably on the base body, and an eccentric lug, upon pivoting of the actuator into the second actuating position, displaces the hollow element into the second axial position. It is understood that the actuating means can also be pivotably supported on the hollow body, in which case the eccentric lug cooperates with a counterpart bearing on the base body, in order to bring about a relative displacement between the base body and the hollow element by pivoting of the actuating means.

In another advantageous feature of the invention, the actuator is lockable in detent fashion in at least the second actuating position via a detent locking means. This provision prevents the actuating means, for instance under the influence of the bias of the spring, from being shifted automatically during the length adjusting process out of the second actuating position into the first actuating position. As a result, the length adjustment process can be completed unimpeded and securely, since because of the detent locking, the hollow element is retained stably in the second axial position. The locking means can for instance be embodied as a notch in the hollow element, into which the eccentric lug moves when the actuating means is in the second actuating position.

A further advantage of the device of the invention, in one feature, is that the actuator is inserted with a peg in a bore of the base body and is disposed in an opening of the hollow element, and in the first or second actuating position, a strut of the base body or a wall portion of the hollow element fits at least partly over the actuator. As a result, easy assembly of the device of the invention is assured, since the actuating means with its peg is merely inserted into the bore of the base body, specifically in an intermediate position located between the two actuating positions. To that end, during the assembly of the device, the hollow element should also be kept in a position located between the two axial positions. Once the device has been assembled, the actuating means, for instance in the first actuating position, is partly gripped by a strut of the base body and in the second actuating position is for instance gripped in a wall piece of the hollow element, so that the actuating means is retained on the base body in each of the actuating positions that occur in practice. The intermediate actuating position required for mounting the actuating means is assumed by the actuating means then only whenever the actuating means is shifted, for instance by means of a tool, from the first actuating position to the second actuating position and back again. This feature involves an extremely economical fixation of the actuating means to the base body.

In another advantageous feature of the invention, the possibility exists that the first and/or second actuating position of the actuator is defined by one or more stops, so that the assembly worker can securely shift the actuating means into the second actuating position and/or first actuating position. Naturally the possibility also exists of dispensing with such stops, so that then the actuating means is pivotable freely, for instance by 360°, about the pivot axis.

In a further feature of the invention, it has also proved advantageous that the spring is fastened between a bearing on the hollow element and an abutment on the base body, and the abutment is in particular clipped or screwed to the base body. In this respect, the spring can be fastened or tensed easily between the hollow element and the base body in the production of the device. Naturally the possibility also exists of welding the abutment to the base body or connecting them in some other way.

Reliable operation of the device is also assured by providing in a further feature of the invention that the preferably two profiled segments are received radially displaceably in radial and in particular diametrically opposed receptacles of the base body. In this respect, secure radial guidance of the profiled segments is provided for. The possibility also exists that the profiled segments and the receptacles on the base body are constructed correspondingly asymmetrically, so that automatic provision is made for positionally correct installation of the profiled segments in the receptacles on the base body. In this respect, the profiled bodies and the receptacles can be equipped with corresponding, asymmetrically disposed groove and strut combinations or the like. To convert the axial motion of the hollow element into a radial motion of the profiled segments, it has proved advantageous, in another feature, that the profiled segments have outer inclined faces, which cooperate with counterpart inclined faces of the hollow element.

It has also proved advantageous that the profiled segments are guided on the hollow element by means of a compulsory guide, and struts of the profiled segments engage counterpart struts of the hollow element from behind. It is understood that still other compulsory guidance means can be used. The sole essential factor is that upon a displacement of the hollow element out of the first axial position into the second axial position and vice versa, the profiled segments are moved under automatic guidance radially outward and radially inward.

In a further embodiment of the invention the actuator or locking member has at least one spring arm, connected to the hollow element, and at least one abutment is disposed on the base body, against which abutment the arm is engaged in the second actuating or locking position or the second axial position of the element. In this embodiment, the spring arm in the first actuating or locking position is not engaged against the abutment of the base body, so that the axially displaceably guided hollow element is located in the first axial position, in which the base body and the component are rigidly coupled in the axial direction in the locking position. To shift the actuating means, in this case the elastic arm, into the second actuating position, the hollow element is shifted by hand, counter to the force of the spring bias, into the unlocking position, and then the spring arm automatically engages the abutment from behind and retains the hollow element in the second axial position, counter to the action of the spring bias. For locking the device, the spring arm is brought out of engagement with the abutment by being deflected outward, so that under the influence of the spring bias, the hollow element is shifted into the locking position, in which the spring-elastic arm is then in the first actuating position and is out of engagement with the abutment.

It has proved to be advantageous that the actuating means has two spring arms, which are connected to the hollow element. In particular, the two spring arms are also connected to one another in the region of the free ends by means of a hoop, and each of the spring arms, with its free end, contacts a respective abutment of the base body in the second actuating position, or is engaged against this abutment. By these provisions, on the one hand the hollow element is securely retained in the unlocking position, maximally precluding any unintentional shifting of the hollow element into the first axial position. On the other, this locking process can be performed purposefully, simply and quickly by a worker, by bringing the spring arm or spring arms out of engagement with the abutment by means of the hoop.

In another advantageous feature, the abutment or abutments are each components of a respective longitudinal rib disposed on the base body, on which the arm or arms rest on one side. The spring arms are securely guided as a result.

Advantageously, the abutment is embodied as a lug or stop, and a runup incline is associated with the lug or the stop, so that the spring arm or arms or lateral extensions that come to rest on the abutment can be first, upon a shift of the spring arms from the first actuating position into the second actuating position, guided via the stop or the abutment without major expenditure of force and in the process can be deflected elastically out of their position of repose and then, after the shift of the abutment into the non-deflected position, can return so that they can then be engaged against the abutment or abutments in the second actuating position.

In another, intrinsically independent feature of the invention, which can also be employed independently of the use of an actuating means embodied in any way whatever, it is provided that the base body has at least one and preferably two longitudinal slits, in which a captive securing means disposed on the bar-shaped component is guided. This captive securing means assures that when the device is in the unlocking position, the bar-shaped component cannot fall by mistake out of the device, since the axial displacement path of this elongated component is limited by the displacement securing means to the individual embodiment of the length of the longitudinal slit.

In this respect it has proved advantageous that the longitudinal slit extends along the base body over the maximum required range of longitudinal adjustment.

It also proves to be advantageous that the captive securing means, secured against axial displacement, is joined to the bar-shaped component.

In an advantageous feature of the invention, the bar-shaped component is joined, radially rotatably, to the captive securing means, so that the bar-shaped component can be joined to a remote control or the like, for instance by screws or similar means.

The captive securing means itself is embodied for instance as a clamp, preferably a plastic clamp, and between the legs of this clamp, the bar-shaped component is axially secured and is received radially rotatably. Then the U-shaped connection of the two legs of the clamp for instance dipped into one longitudinal slit of the base body, while the free ends of the legs dip into the other longitudinal slit thereof. As a result, the free axial displacement path of the bar-shaped component, on which the clamp is secured axially nondisplaceably, is limited to the length of the longitudinal slits.

To prevent unintended loosening of the captive securing means from the elongated component, it has proved advantageous that one free end of at least one leg has an outward-angled lug, which fits over the side wall of the longitudinal slit radially outward of the base body. Because of this provision, the captive securing means is secured in captive form on the elongated component.

Further objects, advantages, characteristics and possible uses of the present application will become apparent from the ensuing description of a plurality of exemplary embodiments in conjunction with the drawings. All the characteristics described and/or shown in the drawings, on their own or in arbitrary appropriate combination, form the subject of the present invention, independently of how they are summarized in the claims or by the claims dependency.

BRIEF DESCRIPTION OF THE DRAWINGS

FIG. 1 is a view of a first exemplary embodiment of the device of the invention in longitudinal section;

FIG. 2 is a view of the device of FIG. 1, rotated by 90°, partly in longitudinal section, with the hollow element located in the first axial position;

FIG. 3 is a view of the device of FIG. 1, partly in longitudinal section, with the hollow element located in the second axial position;

FIG. 4 is a view of the device of FIG. 2 taken along the section line A—A;

DETAILED DESCRIPTION OF THE INVENTION

Figure 5:
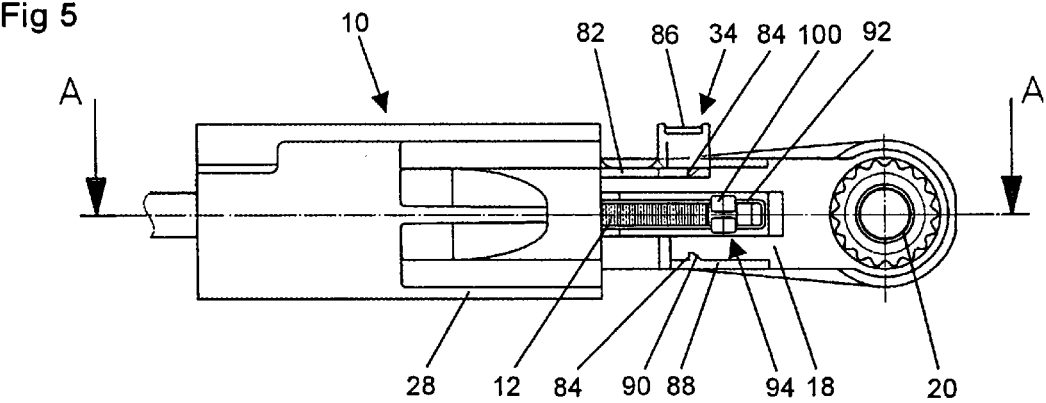
FIG. 5 is a side view of a second exemplary embodiment of the device of the invention.
Figure 6:
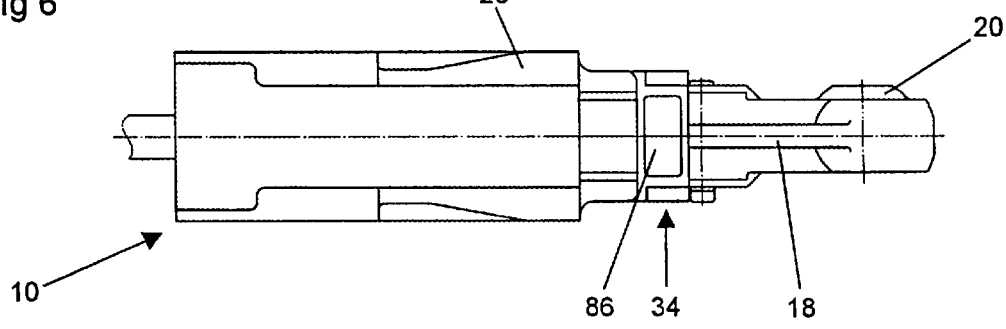
FIG. 6 is side view of the device of FIG. 5 rotated by 90°.

The embodiment shown in FIGS. 1–4 of the device 10 according to the invention for length adjustment, in particular of a remote control in motor vehicles, has a bar-shaped component 12, such as a tension or pressure rod, sleeve, bar or the like, that is provided with an external profiling 14, such as a set of teeth. The component 12 is at least partly received in a receptacle 16 of a base body 18, and the base body 18 has a binding 20, pivotable connection piece or the like, and the component 12 can be coupled for instance to a remote control or to an actuating cable. In addition, profiled segments 22, 24 are radially moveable on the base body 18 under the influence of a hollow element 28, such as a sleeve or locking sleeve or the like, that is acted upon by the bias of a spring 26 and is guided axially displaceably on the base body 18. In a first axial position 30 of the hollow element 28, the segments 22, 24 are shifted into a locking position, in which the base body 18 and the component 12 are coupled rigidly in the axial direction. In a second axial position 32 of the hollow element 28, the profiled segments 22, 24 are shifted into an unlocking position, in which the base body 18 and component 12 are displaceable relative to one another in the axial direction. It is understood that the profiling of the profiled segments 22, 24 corresponds to the external profiling 14 of the component 12.

The device has an actuating means or locking member 34 with at least two actuating or locking member positions 36, 38; in the first actuating or locking member position 36, the hollow element 28 is shifted under the influence of the spring bias into the first axial position 30, and in the second actuating or locking member position 38, the hollow element 28 is shifted into the second axial position 32 counter to the effect of the spring bias. The actuating means 34 is preferably embodied as an eccentric 40 and optionally has a receptacle (such as a slot), polygonal peg (nut) or similar handle 42, so that the actuating means 34 can be shifted from one actuating position 36, 38 into the other actuating position 38, 36 by using a tool, such as a screwdriver, wrench or the like or by hand. The actuating means 34 is supported pivotably on the base body 18, and upon pivoting of the actuating means into the second actuating position 38, an eccentric lug 44 displaces the hollow element out of the first axial position 30 into the second axial position 32. Via a locking means 46, the actuating means 34 can be locked in the second actuating position 38. The actuating means 34 is inserted with a peg 48 into a bore 50 of the base body 18 and is disposed in an opening 52 of the hollow element 28. In the first and second actuating position 36, 38, the actuating means 34 is gripped at least partly by a strut 54 of the base body and by a wall piece 56 of the hollow element 28, respectively, and is thus retained securely on the base body 18 without further securing means. By appropriate, cooperating struts or ribs on the actuating means 34 and base body 18, a stop 58 is defined, by which the second actuating position 38 of the actuating means 34 is fixed or defined. It is understood that such stops can also be provided for defining the first actuating position 36.

The spring 26 providing the spring bias is fastened between a bearing 60 on the hollow element 28 and an abutment 62 on the base body 18, the abutment 62 in particular being clipped or screwed to the base body 18.

The profiled segments 22, 24, preferably two in number, are received radially displaceably in radial receptacles 64, 66 of the base body 18 diametrically opposite one another. The segments 22, 24 have outer inclined faces 68, 70 that cooperate with counterpart inclined faces 72, 74 of the hollow element 28. The profiled segments 22, 24 are also guided on the hollow element 28 by means of a compulsory guide 76, and struts 78 of the profiled segments 22, 24 engage counterpart struts 80 of the hollow element 28 from behind.

The device 10 for length adjustment is manipulated as follows:

After the device has been assembled, for instance on the assembly line of an automobile manufacturer, the actuating means is shifted, for example by means of a screwdriver, out of the first actuating position 36 into the second actuating position 38. In the process, the hollow element 28 is also displaced out of the first axial position 30 into the second axial position 32, and as a result, by means of the compulsory guide 76, the profiled segments 22, 24 are radially displaced from the locking position into the unlocking position. Because of the locking means 46 or other means, the hollow element 28 is retained stably in the second axial position 32 by means of the actuating means 34, which is in the second actuating position 38. The bar-shaped component 12 can now be axially displaced individually in the receptacle 16 of the base body 18 in order to perform the applicable length adjustment. After that, by means of the handle or the like, the actuating means is shifted out of the second actuating position 38 into the first actuating position 36, as a result of which the hollow element 28, under the influence of the bias of the spring 28, is shifted into the first axial position 30. Because of the cooperating inclined faces 68, 70 of the profiled segments 22, 24 and the counterpart inclined faces 72, 74 of the hollow element 28, the profiled segments 22, 24 are moved radially inward toward the bar-shaped component 12, so that the profiling of the profiled segments 22, 24 engages the external profiling 14 of the bar-shaped component 12, as a result of which the base body 18 and component 12 are rigidly coupled to one another in the axial direction.

In principle, the mode of operation of the device shown in FIGS. 5–8 is comparable to that of the exemplary embodiment of FIGS. 1–4, so that below, only the distinctions between them will be addressed. In this preferred embodiment of FIGS. 5–8, the embodiment of the actuating means or locking member 34 differs; it is formed by two spring arms 82, which are joined to the hollow element 28. On the base body 18, one abutment 84 for each spring arm 82 is provided, and the free end of one arm 82 is engaged against each abutment in the second actuating position 38 or second axial position 32 of the hollow element 28. The two spring arms 82 are joined together in the region of their free ends by means of a hoop 86, which in curved fashion grips the base body 18, and by the exertion of radially inward-oriented pressure on this hoop 86, the spring arms 82 can be shifted out of a position of repose into a deflected position.

The abutments 84 are each a component part of a respective longitudinal rib 88 disposed on the base body 18 and are embodied as lugs or as a stop, with a ramp or incline 90 associated with this lug or stop.

Figure 7:
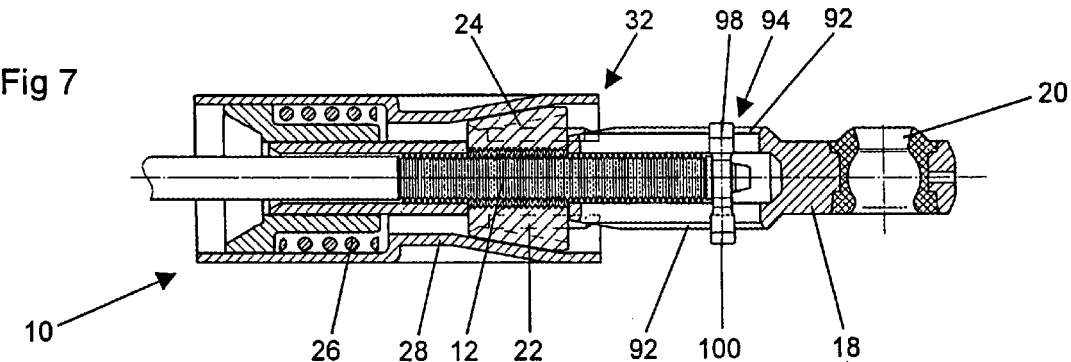
FIG. 7 is a section view of the device of FIG. 5 seen along the section line A—A, in which the hollow element is in the second axial position and the actuating means is in the second actuating position.
Figure 8:
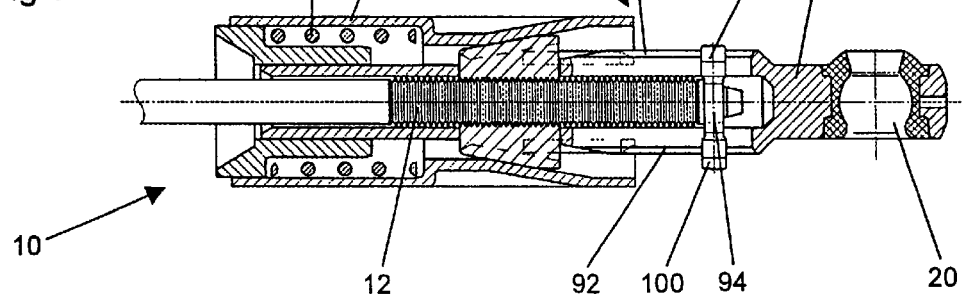
FIG. 8 is a view similar to FIG. 7, in which the hollow element is in the first axial position and the actuating means is in the first actuating position.

For shifting the actuating means or locking member 34 or the spring-elastic arms 82 from the first actuating or locking member position 36 into the second actuating or locking member position 38, the hollow element 28 is displaced out of the first axial position 30 of FIG. 8 into the second axial position 32 of FIG. 7 by displacement by hand counter to the spring bias of the spring 26. In the process, the spring arms 82 slide along the longitudinal ribs 88 and first meet the ramps or inclines 90 and are shifted out of their position of repose into a deflected position and then, after shifting of the abutment 84 as well, snap back into the position of repose. If the worker now lets go of the hollow element 28, the free ends of the spring arms 82, in the second actuating or locking member position 38, engage against the abutment 84, so that the hollow element 28 is secured in the second axial position 32. Once the length adjustment has been performed, the spring arms 82 are shifted, by manual actuation of the hoop 86, from their position of repose in which they are engaged against the abutment 84 into a deflected position, so that the hollow element 28, under the influence of the bias of the spring 26, is shifted from the second axial position 32 into the first axial-position 30. In this process, the spring arms 82 are also returned to their first actuating or locking position 36.

This embodiment is thus distinguished by the fact that the spring arms 82, upon shifting of the device for length adjustment into the unlocking position, are automatically engaged against the abutment or abutments 84. After the length adjustment is completed, the spring arms 82 are released from their contact with the abutment or abutments 84, so that the device is then shifted, because of the bias of the spring 26, out of the unlocking position into the locking position.

These spring arms 82 are relatively easy to actuate, so that in principle no tools have to be used. In addition, when the length adjustment device is shifted by hand from the locking position to the unlocking position, the actuating means automatically engages the abutments from behind and keeps the length adjustment device in this unlocking position until, by exertion of pressure on the hoop 86 that connects the spring arms 82, the arms 82 are released from their contact with the abutment 84, and the length adjustment device is shifted back into the locking position under the influence of the spring bias.

A further advantageous characteristic of this second embodiment is also that the bar-shaped component 24 is secured in the base body 18 by means of a captive securing means 94, which is movable in longitudinal slits 92 of the base body 18. The captive securing means 94 is embodied as a clamp 96, in particular a plastic clamp, which rotatably grips one free end of the component 12 and is axially secured on this component 12. The legs 98 of this clamp 96 are guided in the longitudinal slits 92 of the base body 18, and the length of the longitudinal slits 92 extends over the maximum adjustment range of the length adjusting device. This provision prevents the bar-shaped component 12 from sliding or falling out of the length adjusting device unintentionally when this device is in the unlocking position. The captive securing means 94 itself has lugs 100 angled outward in the region of the free ends of the legs 98, and these lugs fit over the side wall of the longitudinal slit 92 radially outward of the base body 18, so that the captive securing means 94 itself cannot be released unintentionally from the bar-shaped component 12, either.

What is claimed is:

1. A device (10) for longitudinal adjustment of a remote control in motor vehicles, comprising:
   a substantially bar-shaped component (12) that has an external profiling (14), the component being a tension or pressure rod, sleeve or bar,
   a base body (18) having a receptacle for receiving the component at least partly therein,
   at least one profiled segment (22, 24) movable on the base body between a locked position in which the component (12) and the base body (18) are rigidly coupled in the axial direction and an unlocked position in which the component (12) and the base body (18) are displaceable relative to one another in the axial direction,
   a hollow element (28) axially displaceable on the base body (18) from a first axial position to a second axial position for transferring the profiled segment (22, 24) from the locked position to the unlocked position,
   a spring (26) for biasing the hollow element (28) to the first axial position,
   a locking member (34) with two locking member positions (36, 38), wherein in the first locking member position (36), the hollow element (28) is held in the first axial position (30) by the action of the spring bias, and in the second locking member position (38) the hollow element (28) is held in the second axial position (32) by means of the locking member (34) counter to the action of the spring bias, and characterized in that
   the locking member (34) has at least one spring-elastic arm (82), connected to the hollow element (28), and at least one abutment (84) is disposed on the base body (18), wherein the arm (82) engages the abutment in the second locking member position (38) and the second axial position (32) of the hollow element (28).

2. The device of claim 1, characterized in that the locking member (34) has two spring-elastic arms (82) connected to the hollow element (28), which are joined to one another via a hoop (86), and each of the arms (82) is engaged with a respective abutment (84) of the base body (18) in the second locking member position (38).

3. The device of claim 1, characterized in that the abutment (84) is a component of a respective longitudinal rib (88) disposed on the base body (18).

4. The device of claim 1, characterized in that the abutment (84) is a lug or stop, and an incline (90) is associated with the lug or the stop.

5. A device (10) for longitudinal adjustment of a remote control in motor vehicles, comprising:
   a substantially bar-shaped component (12) that has an external profiling (14), the component being a tension or pressure rod, sleeve or bar,
   a base body (18) having a receptacle for receiving the component at least partly therein,
   at least one profiled segment (22, 24) movable on the base body between a locked position in which the component (12) and the base body (18) are rigidly coupled in the axial direction and an unlocked position in which the component (12) and the base body (18) are displaceable relative to one another in the axial direction,
   a hollow element (28) axially displaceable on the base body (18) from a first axial position to a second axial position for transferring the profiled segment (22, 24) from the locked position to the unlocked position,
   a spring (26) for biasing the hollow element (28) to the first axial position,
   a locking member (34) with two locking member positions (36, 38), wherein in the first locking member position (36), the hollow element (28) is held in the first axial position (30) by the action of the spring bias, and in the second locking member position (38) the hollow element (28) is held in the second axial position (32) by means of the locking member (34) counter to the action of the spring bias, and characterized in that
   the base body (18) has at least one longitudinal slit (92), in which a captive securing means (94) disposed on the bar-shaped component (12) is guided.

6. The device of claim 5, characterized in that the longitudinal slit (92) extends along the base body (18) over a range of longitudinal adjustment.

7. The device of claim 5, characterized in that captive securing means (94), secured against axial displacement, is joined to the bar-shaped component (12).

8. The device of claim 7, characterized in that the bar-shaped component (12) is joined, radially and rotatably, to the captive securing means (94).

9. The device of claim 5, characterized in that the captive securing means is a clamp (96) having legs (98) between which the bar-shaped component (12) is received such that it is axially secured.

10. The device of claim 9, characterized in that one free end of at Least one leg (98) has an outward-angled lug (100), which fits over the side wall of the longitudinal slit (92) radially outward of the base body (18).

* * * * *